US012596968B2

(12) United States Patent
Anders et al.

(10) Patent No.: US 12,596,968 B2
(45) Date of Patent: Apr. 7, 2026

(54) MODELS FOR ESTIMATING ETA AND DWELL TIMES FOR TRANSPORTATION OF OBJECTS

(71) Applicant: CHORUSVIEW, INC., Las Vegas, NV (US)

(72) Inventors: Geoffrey Anders, San Francisco, CA (US); Zhipeng Wang, San Carlos, CA (US)

(73) Assignee: CHORUSVIEW, Inc., Las Vegas, NV (US)

( * ) Notice: Subject to any disclaimer, the term of this patent is extended or adjusted under 35 U.S.C. 154(b) by 307 days.

(21) Appl. No.: 18/126,789

(22) Filed: Mar. 27, 2023

(65) Prior Publication Data

US 2024/0211822 A1     Jun. 27, 2024

Related U.S. Application Data

(60) Provisional application No. 63/476,658, filed on Dec. 22, 2022.

(51) Int. Cl.
*G06Q 10/047*          (2023.01)
*G06Q 10/0833*        (2023.01)
          (Continued)

(52) U.S. Cl.
CPC ....... *G06Q 10/047* (2013.01); *G06Q 10/0833* (2013.01); *G08G 1/0129* (2013.01); *H04W 4/80* (2018.02)

(58) Field of Classification Search
CPC ... G06Q 10/047; G06Q 10/0833; H04W 4/80; G08G 1/0129
See application file for complete search history.

(56) References Cited

U.S. PATENT DOCUMENTS

2021/0012287 A1    1/2021   Han et al.
2021/0103892 A1    4/2021   Han et al.
                (Continued)

OTHER PUBLICATIONS

DeepETA: How Uber Predicts Arrival Times Using Deep Learning, DeepETA: How Uber Predicts Arrival Times Using Deep Learning | Uber Blog, https://www.uber.com/blog/deepeta-how-uber-predicts-arrival-times/, retrieved from the Internet on Sep. 22, 2022, pp. 1-18.

*Primary Examiner* — Navid Z. Mehdizadeh
*Assistant Examiner* — Oliver Tan
(74) *Attorney, Agent, or Firm* — Botos Churchill IP Law LLP

(57)          ABSTRACT

Aspects of the disclosure provide for the use and training of a model configured to provide an estimated time of arrival (ETA) for transporting an object. Data may be received from a reader device. The data may identify a tracking tag and a first timestamp. Based on the received data, a location of the tracking tag at the first timestamp may be determined. A starting location and second timestamp for the tracking tag and a destination location and third timestamp for the tracking tag may be identified. A list including at least one dwell time and dwell location for the tracking tag may be identified. The model may be trained to output the ETA, a dwell time, and a dwell location based on the determined location, the starting location, the destination location, the first timestamp, the second timestamp, the third timestamp, and the list.

20 Claims, 15 Drawing Sheets

Warehouse          In Transit          Hospital

(51) Int. Cl.
    *G08G 1/01*        (2006.01)
    *H04W 4/80*      (2018.01)

(56)                 References Cited

U.S. PATENT DOCUMENTS

| | | | |
|---|---|---|---|
| 2021/0140775 A1* | 5/2021 | Siddique | G06N 20/00 |
| 2021/0142279 A1 | 5/2021 | Rusnak et al. | |
| 2021/0264275 A1 | 8/2021 | Han et al. | |
| 2023/0147526 A1* | 5/2023 | Vangipuram | G06Q 50/40 |
| | | | 701/533 |
| 2024/0095611 A1* | 3/2024 | Dzugan | G06N 20/20 |

* cited by examiner

Hospital

In Transit

Warehouse

100

200

200

400

420

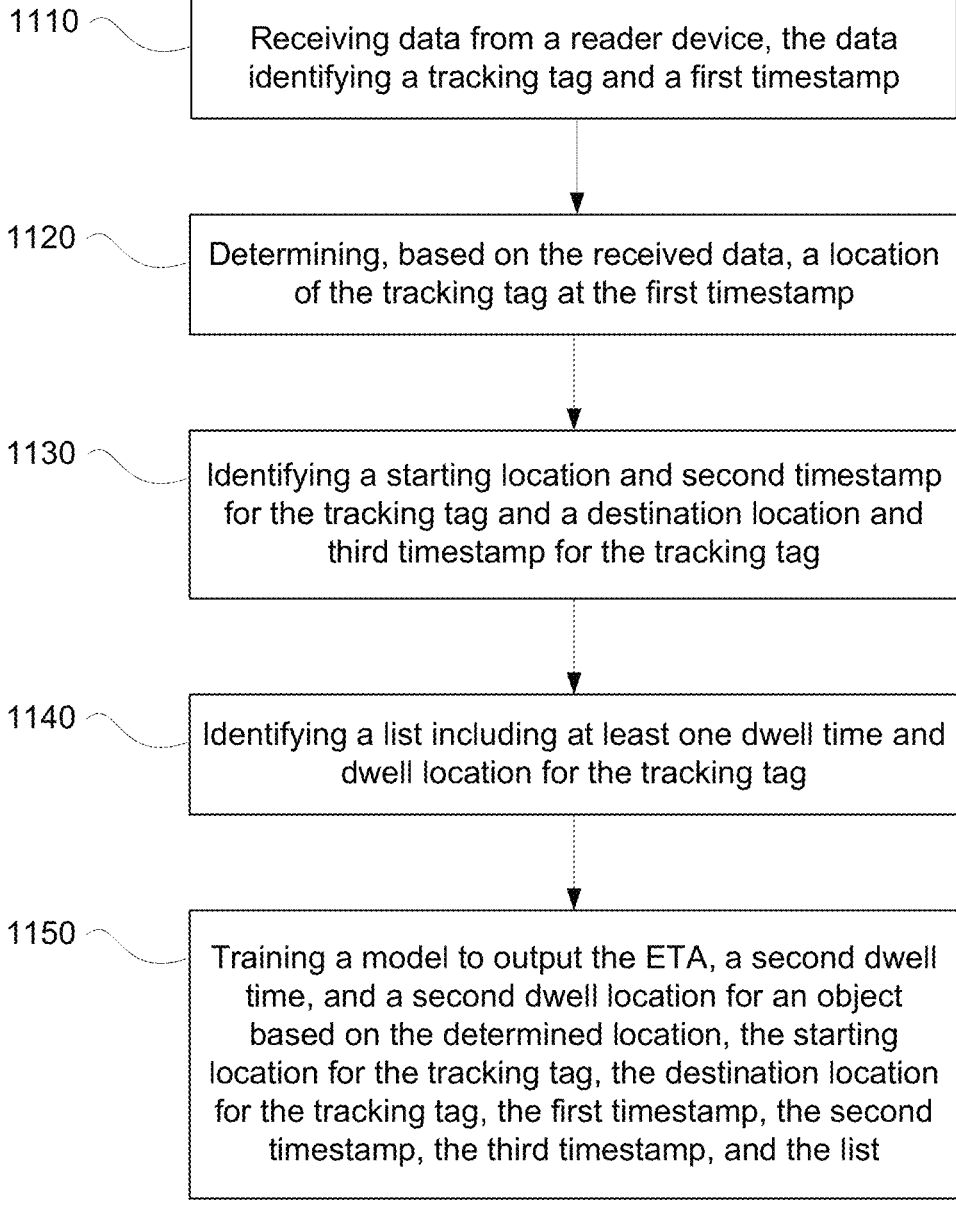

1110 Receiving data from a reader device, the data identifying a tracking tag and a first timestamp 1120 Determining, based on the received data, a location of the tracking tag at the first timestamp 1130 Identifying a starting location and second timestamp for the tracking tag and a destination location and third timestamp for the tracking tag 1140 Identifying a list including at least one dwell time and dwell location for the tracking tag 1150 Training a model to output the ETA, a second dwell time, and a second dwell location for an object based on the determined location, the starting location for the tracking tag, the destination location for the tracking tag, the first timestamp, the second timestamp, the third timestamp, and the list

MODELS FOR ESTIMATING ETA AND DWELL TIMES FOR TRANSPORTATION OF OBJECTS

CROSS REFERENCE TO RELATED APPLICATIONS

The present application claims the benefit of the filing date of U.S. Provisional Application No. 63/476,658, filed Dec. 22, 2022, the entire disclosure of which is incorporated by reference herein.

BACKGROUND

The Internet of Things (IoT) is the inter-networking of physical objects, such as products, packages, vehicles, buildings, etc., that are embedded with electronic components for network connectivity. The embedded components enable objects to detect other objects, be detected by other objects, collect data and/or transmit data. In some examples, the embedded components may include tags or labels attached to the physical objects. These tags or labels may be passive or active. The inter-networking capabilities may be leveraged for tracking locations of physical objects. In many situations, objects may be moved at different points in time, such as a package or equipment moved from a truck to a loading dock to a warehouse, or medical equipment that is moved between different rooms (or floors) in a hospital. These types of situations can be very challenging to determine the location of the object with suitable accuracy, including updating of the location as it changes. In addition, systems that use GPS, WiFi, or LTE may suffer from signal dropout or transmitters going offline, which can reduce the ability to properly identify an object's location as well as to track changes in that location overtime.

BRIEF SUMMARY

One aspect of the disclosure provides a method of training a model to provide an estimated time of arrival (ETA) for transporting an object. The method includes receiving, by one or more processors, data from a reader device, the data identifying a tracking tag and a first timestamp; determining, by the one or more processors, based on the received data, a location of the tracking tag at the first timestamp; identifying, by the one or more processors, a starting location and second timestamp for the tracking tag and a destination location and third timestamp for the tracking tag; identifying, by the one or more processors, a list including at least one dwell time and dwell location for the tracking tag; and training, by the one or more processors, a model to output the ETA, a second dwell time, and a second dwell location for the object based on the determined location, the starting location for the tracking tag, the destination location for the tracking tag, the first timestamp, the second timestamp, the third timestamp, and the list.

In one example, the method also includes determining a run duration based on the second timestamp and the third timestamp, and training the model includes using the run duration. In another example, the data further identifies a mode of transportation associated with the reader device, and training the model further includes using the mode of transportation associated with the reader device to train the model to output one or more modes of transportation with the ETA. In another example, the model is configured to identify dwell locations and dwell times for the object for the ETA. In another example, the method also includes receiving second data from a second reader device, the second data identifying the tracking tag and a fourth timestamp, and determining the location is further based on the second data. In another example, the data indicates that a beacon signal was received by the reader device from the tracking tag at the first timestamp. In another example, the method also includes using the model to determine an ETA for a second object to reach a second destination location. In this example, the method also includes using the model to determine a second dwell time and dwell location for the object to reach the second destination location. In addition, or alternatively, the method also includes receiving second data from a second reader device identifying a tracking tag for the second object; determining a location of the second object based on the received second data; and using the model to determine an updated ETA for the second object based on the determined location of the second object. In addition, the method also includes comparing the updated ETA for the second object to the ETA for the second object to determine whether the second object is delayed. In this example, the method also includes, based on the comparison, providing an alert. In another example, the model is one of an extra tree model, gradient boosted regressor model, random forest model, or a voting regression model. In another example, the model is trained to output a list including the second dwell time, the second dwell location, and a third dwell time and third dwell location.

Another aspect of the disclosure provides a system for training a model to provide an estimated time of arrival (ETA) for transporting an object. The system includes one or more processors configured to: receive data from a reader device, the data identifying a tracking tag and a first timestamp; determine, based on the received data, a location of the tracking tag at the first timestamp; identify, a starting location and second timestamp for the tracking tag and a destination location and third timestamp for the tracking tag; identify a list including at least one dwell time and dwell location for the tracking tag; and train a model to output the ETA, a second dwell time, and a second dwell location for the object based on the determined location, the starting location for the tracking tag, the destination location for the tracking tag, the first timestamp, the second timestamp, the third timestamp, and the list.

In one example, the model is configured to identify dwell locations and dwell times for the object for the ETA. In another example, the one or more processors are further configured to use the model to determine an ETA for a second object to reach a second destination location and to use the model to determine a second dwell time and dwell location for the second object to reach the second destination location. In another example, the one or more processors are further configured to: use the model to determine an ETA for a second object to reach a second destination location; receive second data from a second reader device identifying a tracking tag for the second object; determine a location of the second object based on the received second data; and use the model to determine an updated ETA for the second object based on the determined location of the second object. In this example, the one or more processors are further configured to compare the updated ETA for the second object to the ETA for the second object to determine whether the second object is delayed. In another example, the model is one of an extra tree model, gradient boosted regressor model, random forest model, or a voting regression model. In another example, the model is trained to output a list including the second dwell time, the second dwell location, and a third dwell time and third dwell location.

BRIEF DESCRIPTION OF THE DRAWINGS

FIG. 11 is an example flow diagram in accordance with aspects of the disclosure.

DETAILED DESCRIPTION

Overview

Figure 1A:
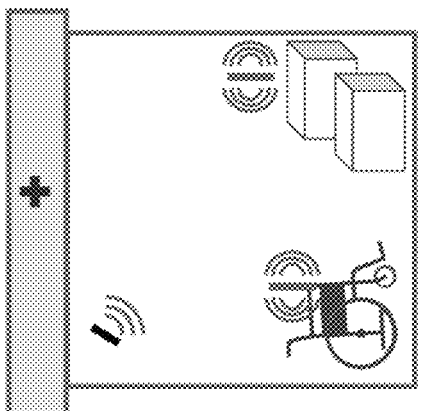
FIG. 1A illustrates various examples for localization of objects in accordance with aspects of the technology.
Figure 1A:
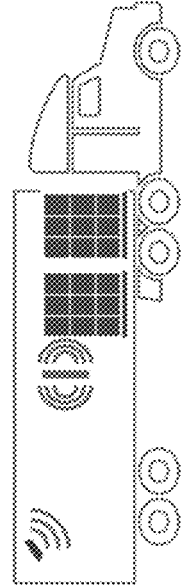
Figure 1A:
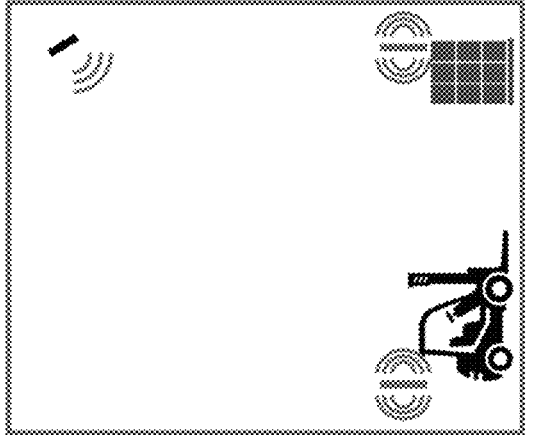

The technology relates to estimating time of arrival (ETA) and dwell times for the transportation of objects such as goods within a supply-chain or other logistics space. For example, some systems may involve tagging objects with tracking tags which periodically transmit beacon signals with identifying information for the objects. Reader devices may receive these beacon signals and provide information from the beacon signals to a backend or server computing device for analysis and tracking purposes. In this regard, such systems may allow for the tracking of objects (e.g., equipment, medical and other supplies, etc.). Because information from such tags and reader devices can be used to track these objects in real time, this information may be leveraged to train machine-learning models for estimating ETA.

While other services may provide ETAs, these services are not typically tailored to address logistical issues which may only affect logistical providers. For example, typical routing services may use a map to determine a route and assume a direct and fastest path to a destination and any intermediate destinations (e.g., waypoints). These services do not consider the length of time an object will spend in a warehouse or sorting facility, travel restrictions and considerations placed on flights (air transport), cargo trucks, boats or trains, or other factors specific to logistics such as requirements for truck drivers to take breaks.

In other words, predicting the end to end transit time of an object faces challenges that differ from typical map-based ETA systems. Through most distribution or transportation and logistics networks assets travel to intermediate nodes like warehouses or sorting facilities and distribution centers before reaching their final destination. The dwell times at these locations are typically unknown and can vary significantly and can drive large errors in predicting total overall transit times even when the travel times between nodes is well understood. Moreover, errors in ETA accumulate in non-linear ways due to process interdependence typical to logistics. For example, if an object arrives late to a warehouse or sorting facility, the object may miss its originally scheduled time to leave that warehouse or sorting facility for its next node or destination location. The object may possibly become stuck or may have to wait until other transportation to that next node or destination location becomes available or is scheduled to leave. This may cause further delays at other warehouses and sorting facilities as the object travels to its destination location. Furthermore, ETA for an asset can be influenced by processes and movement patterns of other network components that do not lie directly in the route that the object takes.

However, many of these considerations may be implicit in data captured by a logistical provider from information collected by the aforementioned reader devices combined with other information. In this regard, in order to train a model, data for a plurality of transportation runs or trips may be collected. This data may include information such as a starting location, start time (timestamp), a destination location (or geofence), ending or destination time (timestamp) for the trip, and a plurality of intermediate locations and corresponding timestamps. Implicit in this data may be "dwell time" or information such as how long an object was located within a warehouse or sorting facility, or information about the mode of transportation for that object. For example, a reader device may be associated with information identifying whether the reader device was located within a warehouse or sorting facility as well as whether the reader device was located within a particular mode of transportation such as an airplane, a cargo truck, a boat, a train, or other mode of transportation. In other instances, this information may be provided in the data for the trip. The model may be trained to output an ETA as well as a list of expected dwell times and locations, for an object to reach a destination from its current location if that object leaves at a particular time. The model may also output information about modes of transportation for an object. This may include a list of likelihoods of an object being transported on an airplane, cargo truck, boat, train or other mode of transportation. In this regard, the starting location and time and destination location may be used as training inputs (e.g., input features of the training data), while other information such as the intermediate locations and timestamps, run duration (which may be determined based on the starting timestamp and destination timestamp), modes of transportation, as well as a list of dwell times and locations, etc. may be used as training outputs (e.g., output variables of the training data). The model itself may be any number of different types of machine-learning models.

The features described herein may allow for highly accurate ETAs for the transportation of objects such as goods within a supply-chain or other logistics space. As discussed above, the modeling may implicitly take into account logistical issues beyond those of a typical routing service without necessarily taking into account map information or an actual route that will be followed by an object to its destination. In addition, the features described herein may allow for the identification of upstream components which may be driving an expected slowdown, thus delivering actionable insights to logistical providers, and enabling them to take corrective action in real-time.

Example Systems

FIG. 1A illustrates examples of different objects in various environments. As shown on the left side image of the figure, there may be packages or equipment on a pallet in a warehouse. The pallet may have come off of a cargo truck as shown by the "In Transit" image in the middle of the figure. The pallet may be moved to one or more different locations within a warehouse, such as by the forklift shown in the left side image. The right-side image in the figure illustrates a situation where medical equipment (e.g., a wheelchair) and supplies in boxes may be stored in a supply room in a hospital.

In all of these situations—in the warehouse, on the cargo truck, or at the hospital, the objects of interest may move around. That may be to a different aisle or room in the warehouse, a different room (or even a different floor) of the hospital, or different part of the cargo container of the truck. In the latter case, the cargo may have shifted during transit or may have been repositioned as different packages were delivered to different locations. Knowing where the objects of interest are currently located, as opposed to where they are presumed to be based on an initial placement, is a valuable piece of information for an office manager, warehouse manager, nurse or orderly to have. Ideally, such people should be able to get the current location of a given object on their client computing device such as a laptop, mobile phone or smartwatch.

Figure 1B:
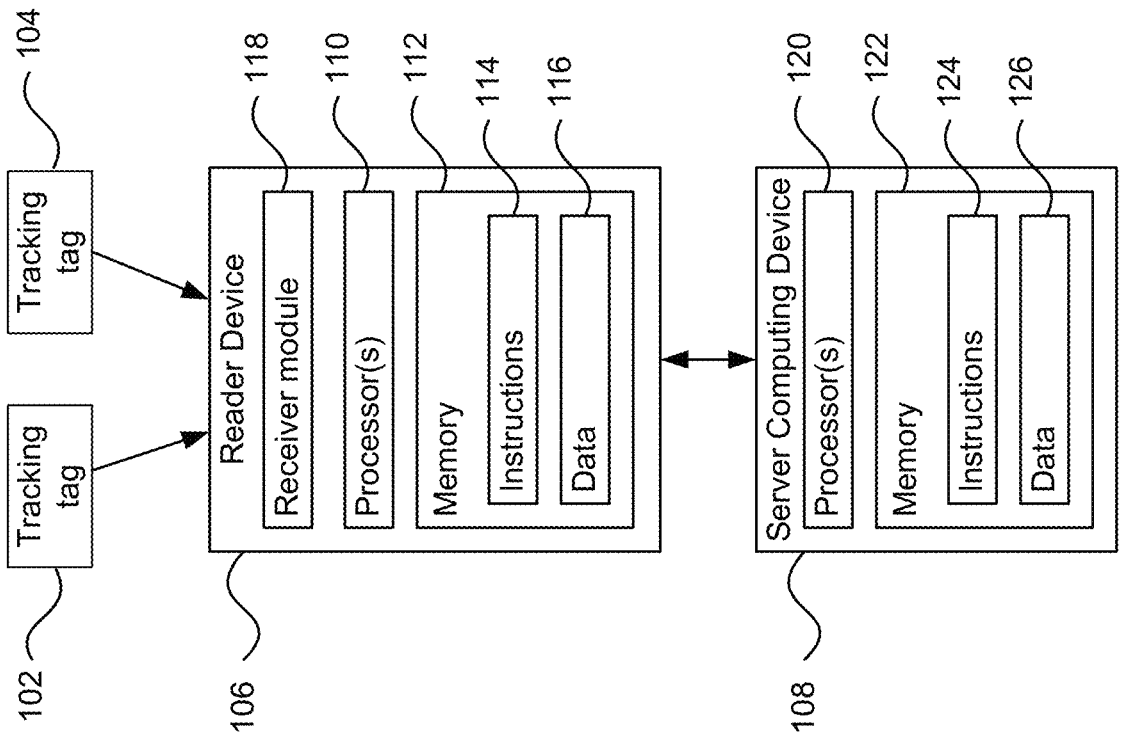
FIG. 1B is a functional diagram of an example tracking system in accordance with aspects of the disclosure.

FIG. 1B is a functional diagram of a tracking system 100. The tracking system 100 may include a plurality of tracking devices, such as tracking tags 102 and 104, and a reader device 106. As discussed further below, one or more server computing devices 108 may also be part of the tracking system 100. A given tracking tag may be placed on or otherwise attached to or inserted into an object to be tracked, such as a package, a piece of equipment, a vehicle, a warehouse section, a room, etc. While tracking tags 102 may be associated with objects such as packages, equipment or vehicles (e.g., a forklift or an autonomous fulfillment robot that can retrieve packages from different locations in a warehouse), tracking tags 104 may be fixed to an aisle in a warehouse or from a specific room in a hospital. Thus, different tracking tags may be used depending upon customer needs. As an example, different customers may have varying accuracy and "liveliness" needs. For instance, one customer may only want to know aisle-level accuracy every day (e.g., before a warehouse closes for the evening), while another customer such as a hospital nurse may need to know which room a piece of equipment is in every hour so that it can be accessed should a patient need such equipment. Each tracking tag 102 or 104 may emit an informational signal, for example a beacon signal, via an antenna, such as using the transmitting device, to communicate data. In this regard, each tracking tag may include an identifier chip (such as for radiofrequency (RF) identification) and/or a transmitting device (such as an RF module configured to transmit beacon signals using a selected frequency band and transmission protocol). In this regard, the beacon signals may simply transmit identifying information in order to enable tracking of objects in the case of tracking tags discussed further below. To facilitate this, each tracking tag may be embedded with a unique identifier, such as a unique MAC address or BLUETOOTH identifier, which may function as a tracking tag identifier. This tracking tag identifier may be assigned to the tracking tag during the manufacturing or provisioning processes (described further below).

The transmitting device of a tracking tag may send such information via radio frequency transmission in a selected frequency band, using a standard or proprietary protocol. By way of example, the transmitting device may employ a BLUETOOTH (e.g., a BLUETOOTH Low Energy (BLE)) or 802.11 protocol in the 2.4 GHz and/or 5 GHz frequency bands. In some examples, each beacon tracking tag and each tracking tag uses the BLUETOOTH or BLE protocol.

In some instances, the tracking tags may include one or more sensors. In such instances, the aforementioned communicated data may be formatted according to the selected protocol and include one or more sensed characteristics of the given tracking tag or its environment. For example, the sensed characteristic may be a temperature, a location, motion, battery conditions, trip conditions, and/or other detectable characteristics of the tracking devices or its environment.

The reader device 106 may be a computing device configured to detect the beacon signals emitted by the plurality of tracking tags 102 and 104, then store and/or transmit data related to the tracking tags. While only one reader is shown in FIG. 1B, the system may employ multiple readers. The reader device 106 may include one or more processors 110, memory 112 and other components typically present in general purpose computing devices. The reader device 106 includes a receive module 118 having an antenna and a processing section (not shown), which may include a band-pass filter for the frequency band of interest, an analog to digital (A/D) converter, and a signal processing module to evaluate information in received beacon signals. The processing section may also convert the received beacon signal to a baseband signal, before or after A/D conversion.

The one or more processors 110 may be any conventional processor, such as commercially available CPUs or microcontrollers. Alternatively, the one or more processors may be a dedicated device such as an ASIC or other hardware-based processor, such as a field programmable gate array (FPGA). Although FIG. 1B functionally illustrates the processor(s), memory, and other elements of the reader device 106 as being within the same block, the processor, computing device, or memory may actually include multiple processors, computing devices, or memories that may or may not be stored within the same physical housing. For example, memory may be a hard drive, a removable USB drive or other storage media located in a housing different from that of the reader device 106. Accordingly, references to a processor or computing device will be understood to include references to a collection of processors or computing devices or memories that may or may not operate in parallel.

The memory 112 stores information accessible by the one or more processors 110, including instructions 114 and data 116 that may be executed or otherwise used by the processor(s) 110. The data may include sensed characteristics from any of the tracking tags 102 and/or 104 received by the reader device 106. The memory 112 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 116 may be retrieved, stored or modified by processor(s) 110 in accordance with the instructions 114. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 114 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

In some implementations, the tracking system 100 may further include a central server, such as one or more server computing devices 108 accessible by the one or more processors 110 of the reader device 106. In some implementations, one or more tracking devices in the tracking system 100, such as a tracking tag 104, may be configured to obtain and communicate data directly to the one or more server computing devices 108. The one or more server computing devices 108 may include one or more processors 120, memory 122 and other components typically present in general purpose computing devices. The one or more processors 120 may be the same or similar type as the one or more processors 110, and the memory 122 may be the same or similar type as the memory 112. The memory 122 stores information accessible by the one or more processors 120, including instructions 124 and data 126 that may be executed or otherwise used by the processor(s) 120. Data 126 and instructions 124 may be the same or similar type as the data 116 and instructions 114, respectively.

After detecting the beacon signals of one or more tracking tags 102 or 104, the reader device 106 may transmit the data from the tracking tags to the one or more server computing devices 108 through an existing connection or through a network. Thus, in this case the reader device 106 may include a transmitter module (not shown) that is configured for wired or wireless transmission to the server computing device. The data may be received in a series of payloads (e.g., data packets) either continually, at one or more set intervals, or ad hoc whenever the tracking tags transmit. Thus, when there are multiple tracking tags, the data is effectively received as a plurality of separate data streams. A given payload (which may comprise one or more data packets) may include measurements taken at one or more time intervals, each of which may have a corresponding timestamp. In one scenario, the reader device 106 may include a transceiver including both a receiver and a transmitter, which is configured to receive beacon signals from the tracking tags 102 and 104 and also to send and receive information with the one or more server computing devices 108.

The one or more server computing devices 108 may be configured to track characteristics of the tracking devices for one or more alerts based on a plurality of conditions. The plurality of conditions may include at least one condition for each characteristic, such as a minimum, a maximum, a threshold, a duration, or a geofence. The conditions may be predetermined or set based on user input. For example, a first alert may be set for when (1) a temperature is greater than, e.g., 0° C. to 10° C. for 30 minutes and (2) the tracking device is on a trip, which may indicate overheating of a cooled package or storage compartment. A second alert may be set for when (1) no motion is detected for 10 minutes, (2) 2 of 3 locations are in a geofence, and (3) the tracking device is on a trip, which may indicate that a package is out for delivery. A third alert may be set for when (1) a threshold amount of light is detected from inside a package and (2) the tracking device is on a trip, which may indicate unexpected opening of the package or tampering. A fourth alert may be set for when (1) a threshold amount of light is detected from inside a package and (2) 2 of 3 locations are in a destination geofence, which may indicate opening of the package after delivery or receipt. Many other alert conditions and tracking scenarios are possible, and the above examples are not intended to be limiting.

The tracking system 100 may optionally include an application that may be installed on one or more client computing devices. Using the application, the client computing devices may access the data from the reader device 106 and/or the one or more server computing devices 108 through a network.

Figure 2:
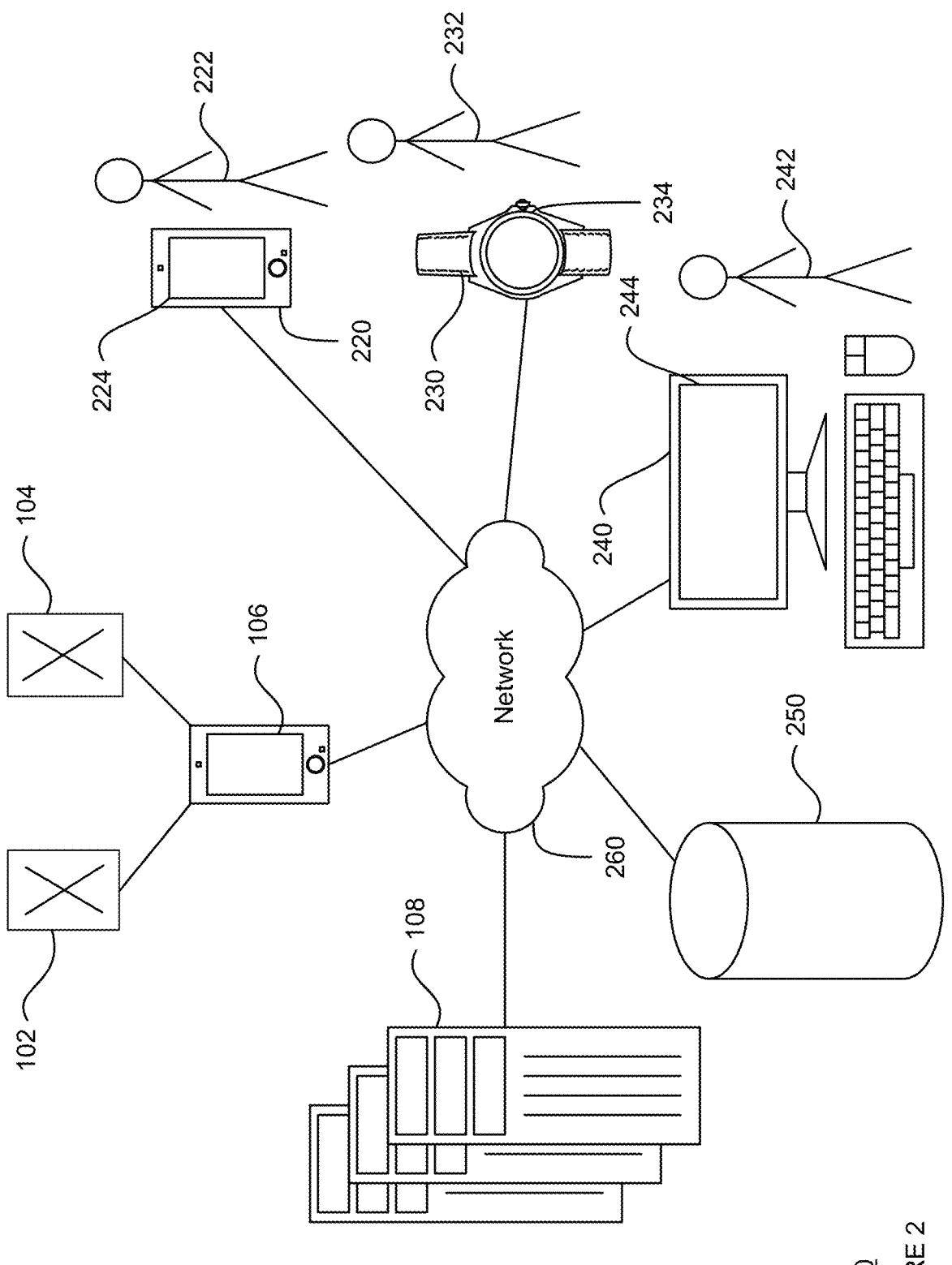
FIG. 2 is a pictorial diagram of an example network in accordance with aspects of the disclosure.
Figure 3:
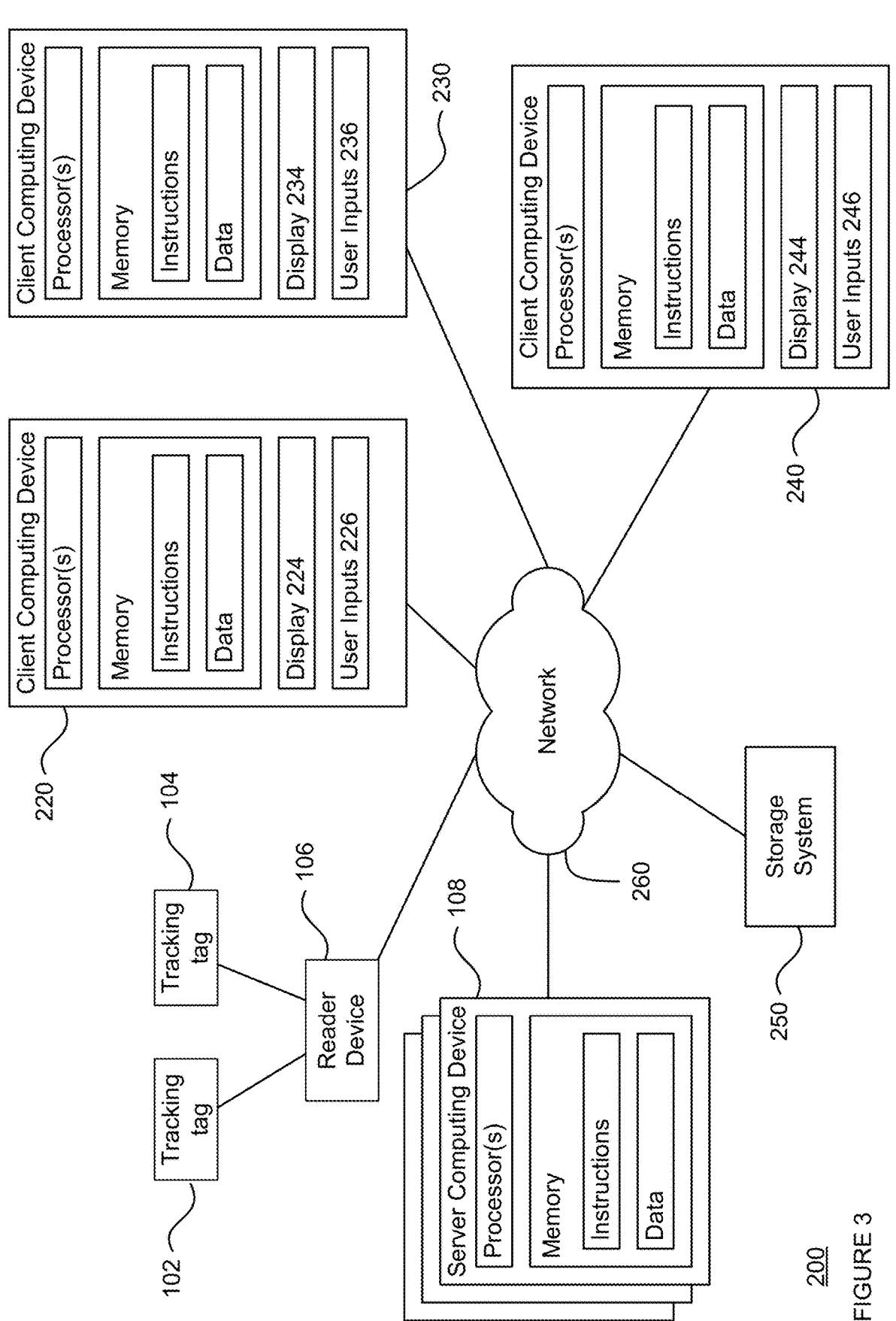
FIG. 3 is a functional diagram of the example network in FIG. 2 in accordance with aspects of the disclosure.

FIGS. 2 and 3 are pictorial and functional diagrams, respectively, of an example system 200 that includes a plurality of client computing devices 220, 230, 240 and a storage system 250 connected via a network 260. System 200 also includes tracking system 100, including tracking tags 102, 104, reader device 106, and the one or more server computing devices 108. Although only a few tags, reader devices, and computing devices are depicted for simplicity, a typical system may include significantly more.

Using the client computing devices, users, such as user 222, 232, 242, may view the location data on a display, such as displays 224, 234, 244 of respective client computing devices 220, 230, 240. As shown in FIG. 3, each client computing device 220, 230, 240 may be a personal computing device intended for use by a respective user and have all of the components normally used in connection with a personal computing device including one or more processors (e.g., a central processing unit (CPU)), memory (e.g., RAM and internal hard drives) storing data and instructions, a display such as displays 224, 234, 244 (e.g., a monitor having a screen, a touch-screen, a head-mounted display, a smartwatch display, a projector, a television, or other device that is operable to display information), and user input devices 226, 236, 246 (e.g., one or more of a mouse, keyboard, touch screen and/or a microphone). The client computing devices may also include speakers, a network interface device, and all of the components used for connecting these elements to one another.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 or reader device 106 may be a mobile phone or a device such as a wireless-enabled PDA, a tablet PC, a wearable computing device or system (e.g., a smartwatch or head-mounted display, or a netbook that is capable of obtaining information via the Internet or other networks. As an example, the user may input information using a small keyboard, a keypad, microphone, using visual signals (gestures) with a camera or other sensor, or a touch screen.

As with memory 112, storage system 250 can be of any type of computerized storage capable of storing information accessible by the one or more server computing devices 108, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 250 may be connected to the computing devices via the network 260 as shown in FIG. 2, and/or may be directly connected to or incorporated into any of the client computing devices 220, 230, 240. The storage system 250 may store information about the tracking tags including, for example, location, status (e.g., activated and when), identifiers, last update, sensor data (e.g., temperature measurements), information about the object to which the tracking tag is attached (e.g., manufacturing data), and so on. In this regard, the information may be determined from received beacon signals provided to and updated at the storage system 250 by any of the one or more server computing devices 108 and/or client computing devices 220, 230, 240.

Figure 4A:
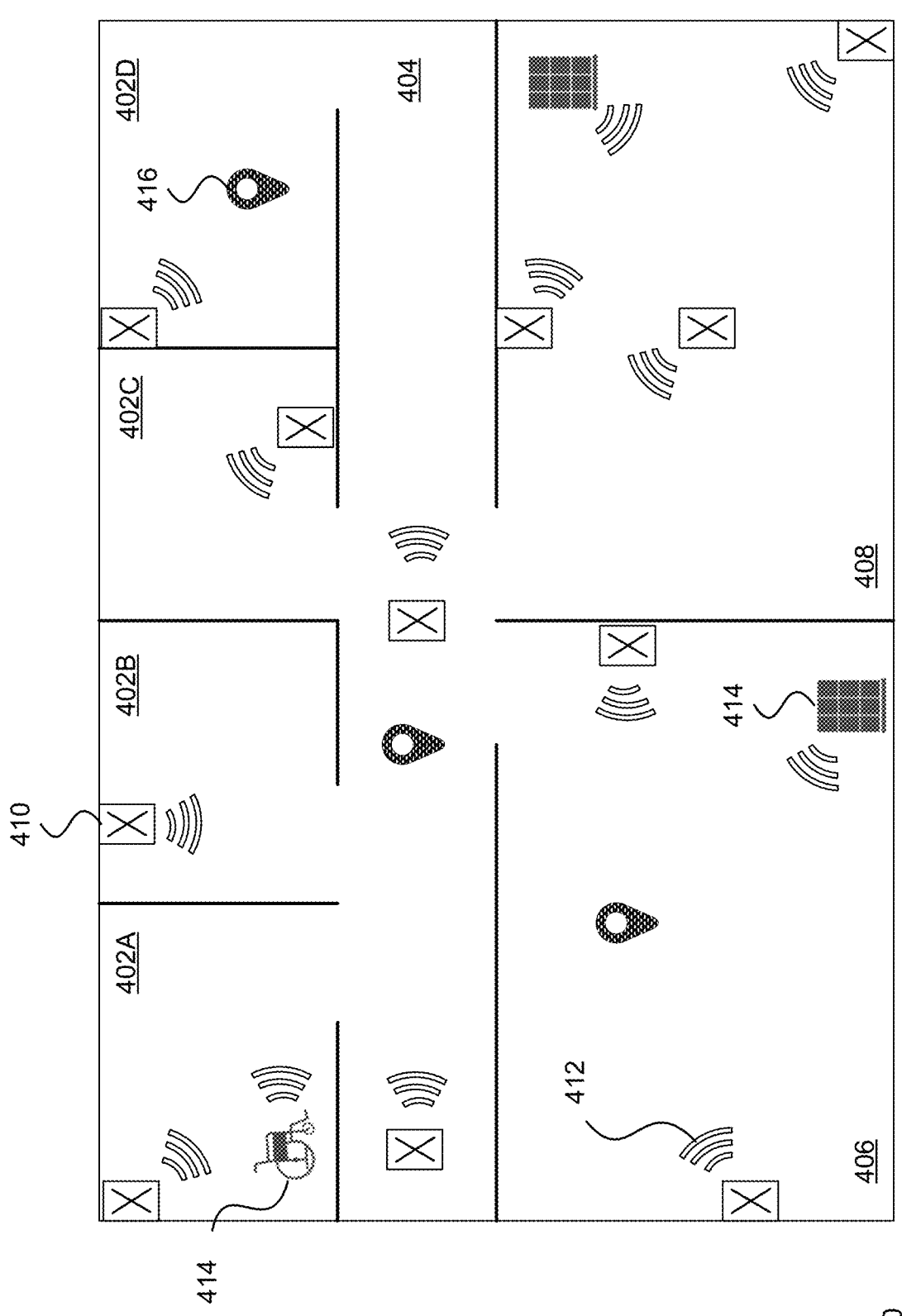
FIGS. 4A-B illustrate example scenarios in accordance with aspects of the disclosure.

FIG. 4A illustrates one example 400 of a system having a number of tracking tags arranged in various locations of a building (e.g., a hospital). In this example, there may be a number of rooms 402A, 402B, 402C, 402D, such as patient rooms, along one side of a hallway 404. On the opposite side of the hallway 404 there is a storage room 406, such as to house equipment or supplies, as well as another room 408, which may be a meeting room, common area, rehab facility or the like. One or more tracking tags 410 corresponding to the tracking tags 102 or 104 may be located in each room, including the hallway. Each tracking tag 410 may be fixed to a location in the rooms and configured to emit beacon signals 412 (e.g., RF signals in a selected frequency band according to a particular communication protocol). While the beacon signals 412 may appear directional, this need not be the case and the beacon signals may be transmitted omnidirectionally, for instance from a tracking tag 410 that is located on the ceiling, pillar or floor. In some implementations, the tracking tag 410 may be configured to emit beacon signals with information associated with its environment (e.g., temperature, humidity, etc.).

Tracking tags 414 may correspond to tracking tags 102 or 104 when placed on a variety of objects (e.g., a case of supplies as shown in storage room 406 or a wheelchair shown in room 402A). In some instances, the tracking tags may also be configured to emit beacon signals with information associated with the object on which the tracking tag is applied (e.g., temperature, motion information, object details, and/or other detectable characteristics of the tracking device or its environment). Reader devices 416 (which may be configured the same or similarly to reader device 106) may be found at various locations in the building, such as in a patient room, the storage room, the hallway or other location. Note that even if transmitted omnidirectionally, the beacon signals from a given tracking tag may be attenuated in a non-uniform manner due to the presence of walls, furniture, floors/ceilings, equipment, etc.

Figure 4B:
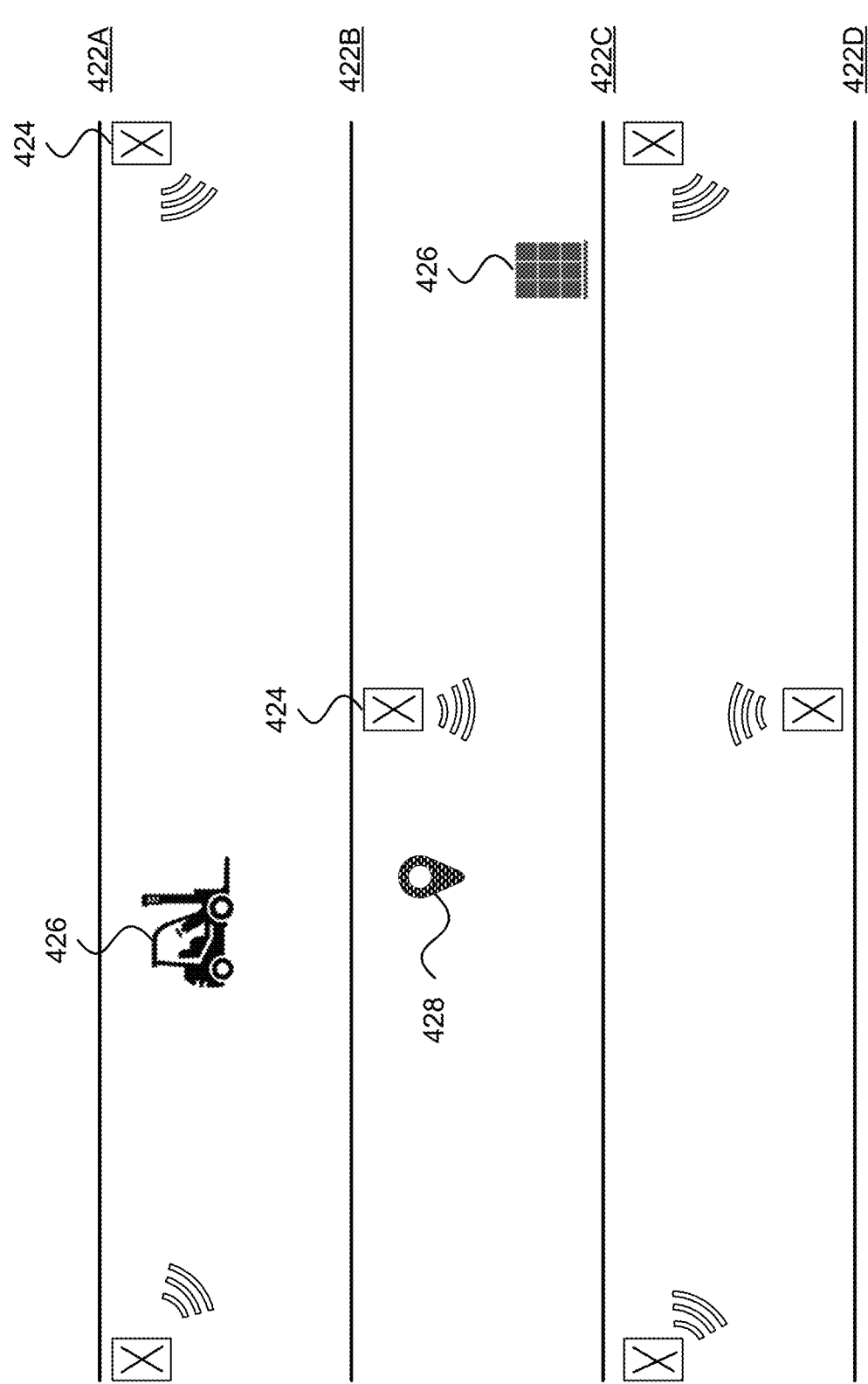

FIG. 4B illustrates another example 420 of a system having a number of fixed tracking tags positioned along different aisles in a warehouse setting. In this example, there are a number of aisles 422A, 422B, 422C, 422D, although there may be more (or fewer) aisles, and the aisles may be arranged in other configurations than what is shown. Here, fixed tracking tags 424 are located at different places for the aisles, such as along aisle end caps, along the ceiling (or floor), on shelves, storage lockers, cabinets or other places along the aisle, etc. Similar to FIG. 4A, fixed tracking tags 426 are placed on or otherwise associated with different objects, such as a pallet of equipment or a forklift that retrieves items from their locations in the warehouse. As above, the fixed tracking tags are configured to transmit beacon signals that are detectable by one or more reader devices 428 (which may be configured the same or similar to reader device 106).

Figure 5:
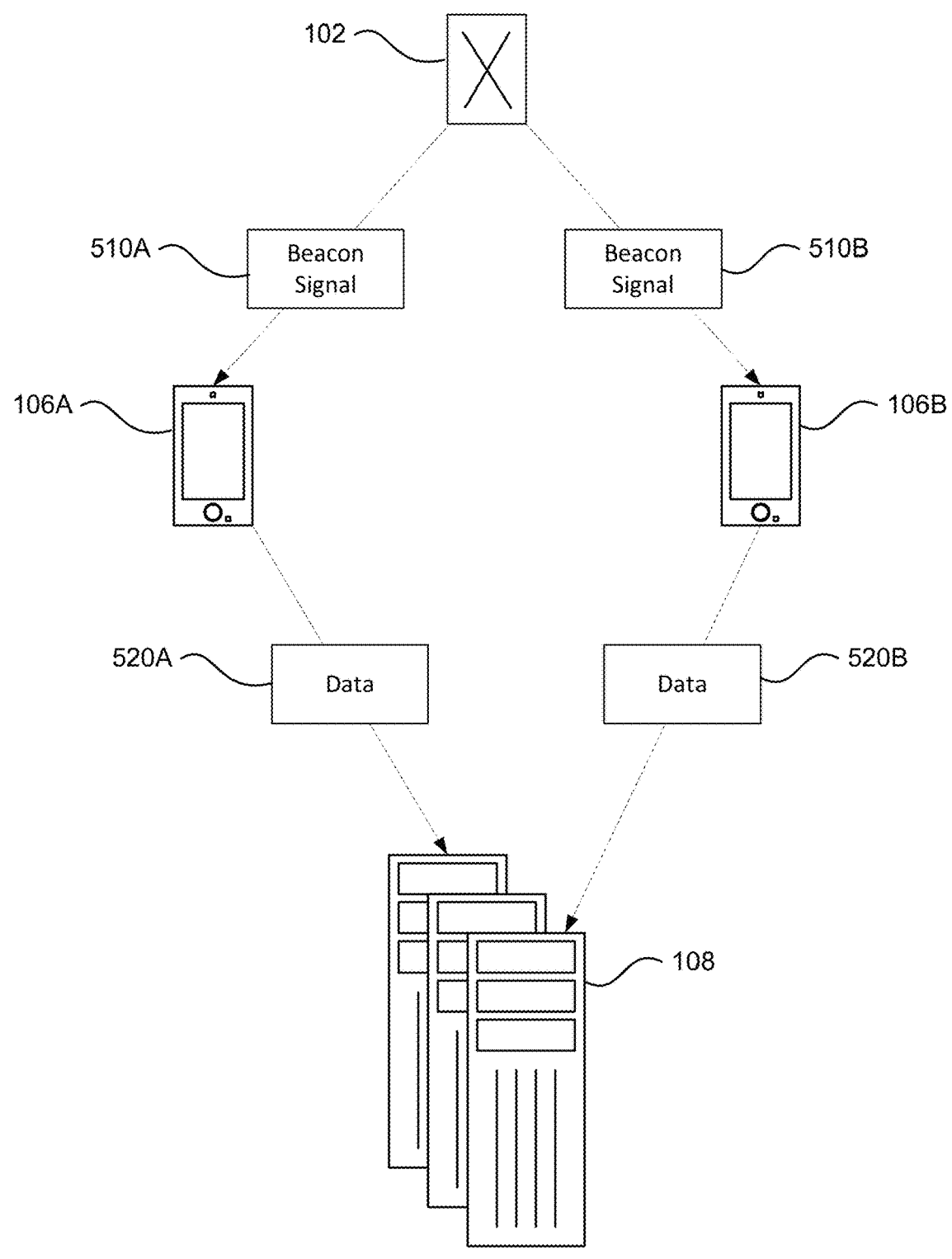
FIG. 5 is an example functional diagram of a tracking tag, reader devices, and server computing devices in accordance with aspects of the disclosure.

For example, referring to FIG. 5, tracking tag 102 may transmit beacon signals 510A, 510B which may be received by reader devices 106A, 106B (which may be configured the same or similarly to reader device 106). Each reader device in turn may transmit data 520A, 520B to the one or more server computing devices 108. As noted above, this data may provide information about the beacon signals 510A, 510B received from the tracking tag 102. Such information may include tracking tag identifiers, state information (e.g., whether or not the tracking tag has moved or is moving, temperature measurements, whether one or more thresholds have been met, etc.), etc. Thus, in this example, each of the reader devices 106A, 106B is within range of the tracking tag 102.

Example Methods

FIG. 11 is an example flow diagram 1100 for training a model to provide an estimated time of arrival (ETA) for transporting an object that may be performed by the one or more processors of the one or more server computing devices 108. While FIG. 11 shows blocks in a particular order, the order may be varied and that multiple operations may be performed simultaneously. Also, operations may be added or omitted.

At block 1110, data is received from a reader device. This data identifies a tracking tag and a first timestamp. At block 1120, based on the received data, a location of the tracking tag at the first timestamp is determined. As noted above, the one or more server computing devices 108 may receive information from one or more reader devices identifying timestamps and tracking tag identifiers determined from beacon signals. In order to determine the location of a given tracking tag, the one or more server computing devices 108 may use information such as the location of the reader device providing the data about a tracking tag as a proxy for the location of the tracking tag. For example, the location of a reader device (e.g., GPS or other location) may be used as a proxy for the location of a tracking tag that are within range of one another. In other instances, signal strength information for the beacon signals of the one or more tracking tags combined with the locations of one or more providing reader device may be used to estimate a location of a tracking tag. A series of beacon signals may be ramped at different power levels (a ramped sequence). Evaluating the received beacon signals in view of their transmitted power can enable the one or more server computing devices to determine which room or other location at which a given tracking tag is located. From that, the one or more server computing devices 108 may be able to determine a location for a given tracking tag (and thus its corresponding object) with a suitable degree of certainty, such as by triangulating its position relative to the relevant tracking tags. Still other location determination processes may be used.

At block 1130, a starting location and second timestamp for the tracking tag and a destination location and third timestamp for the tracking tag are identified. As noted above, the location and timestamp information may be associated with the tracking tag identifier and stored in the storage system 250. Overtime, the one or more server computing devices 108 may store a plurality of locations and timestamps for a given tracking tag over the course of a trip. In some instances, a tracking tag may be associated with a particular trip. Each trip may be associated with a starting location and timestamp and a destination location timestamp. This information may be determined based on information provided by a logistics provider identifying an earliest timestamp and/or latest timestamp for a trip, a starting location and/or a destination location, or some combination of these.

In this regard, the storage system 250 may store data for a plurality of trips may be collected. This data may include information such as a starting location, starting timestamp, a destination location (or geofence), ending or destination timestamp for the trip, and a plurality of intermediate locations and corresponding timestamps. The starting and intermediate locations may be as simple as latitude and longitude coordinates and do not require map features, pointers or other references (i.e., are independent of the roads or tracks on which the objects are transported). The times may be absolute times as well as information such as day of week, time of year, etc. The destination location may be defined as a geographic area (e.g., the boundaries of a warehouse or sorting facility or other destination location) rather than a specific latitude and longitude pair such that when an object reaches any point within that destination area, the trip has been completed. This may enable logistics providers to avoid the need to specify an exact destination for a trip.

The intermediate locations may be determined based on information received from a reader device identifying a location of that reader device (e.g., a GPS location) as discussed above. In some instances, the reader devices may be fixed (e.g., mounted at a particular location) and in other instances, the reader devices may be movable (e.g., transported with the objects or attached to mobile assets like trucks, forklifts, etc.). In other examples, the intermediate locations may be determined based on information received from tracking tags attached to an object or objects. The beacon signals from these tracking tags may be received by reader devices and reported to a backend system (e.g., one or more server computing devices) in order to estimate a location of the tracking tag. For instance, a tracking tag may send a beacon signal which is received by a reader device and reported to the server computing devices at fixed intervals such as at least every 15 minutes or more or less.

Figure 6A:
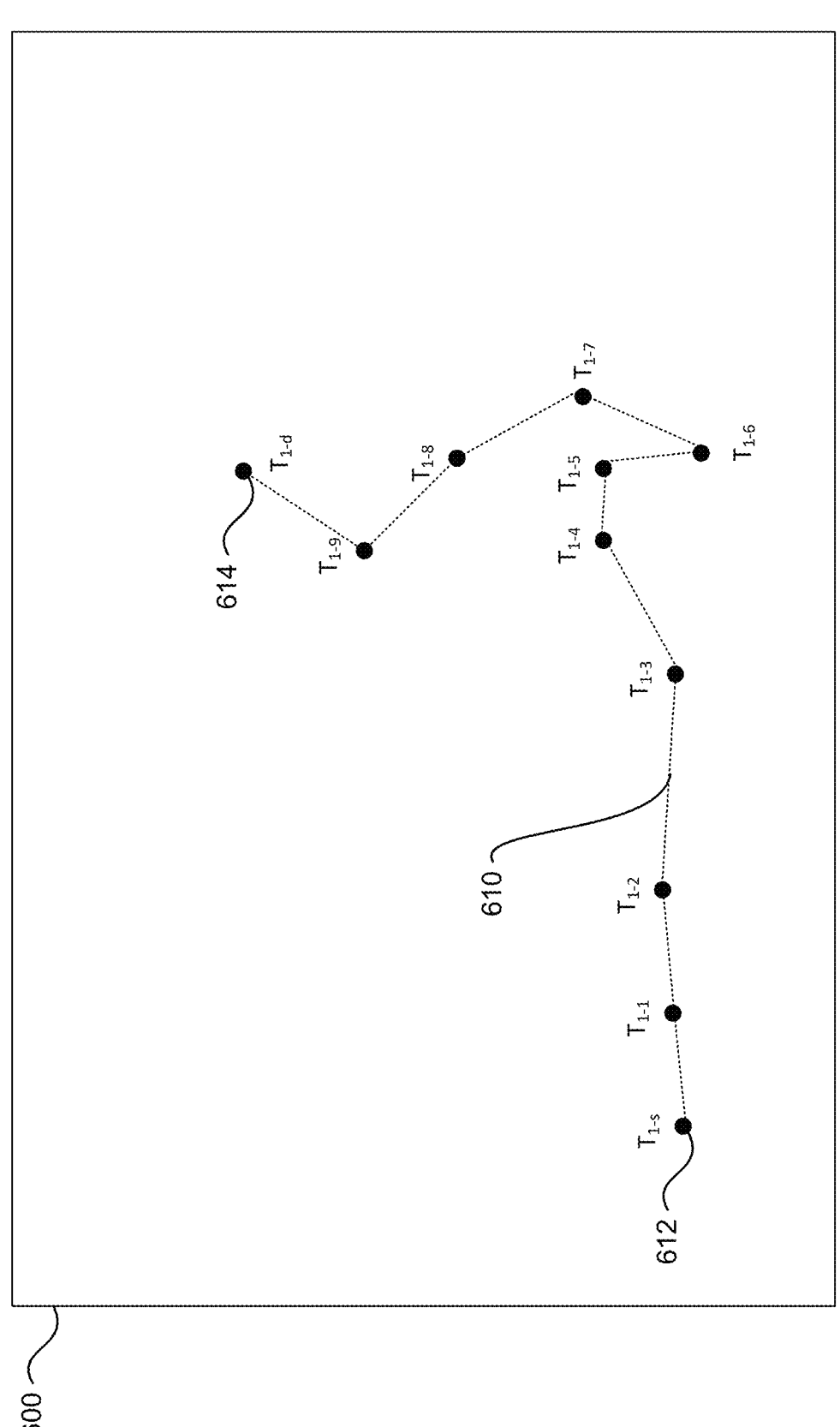
FIGS. 6A and 6B are examples of a geographic area and trip data in accordance with aspects of the disclosure.
Figure 6B:
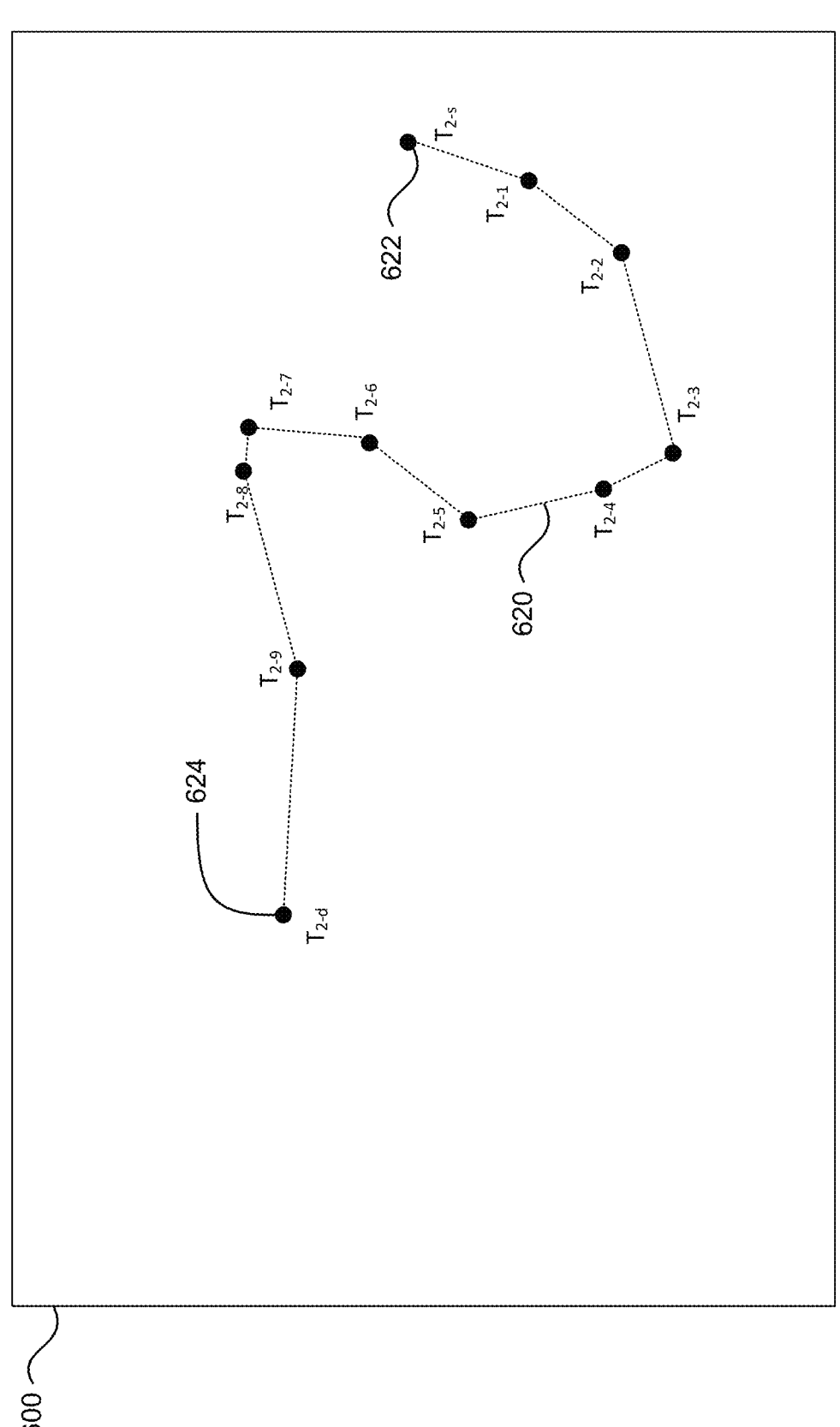

FIG. 6A and FIG. 6B each represent data of the storage system 250 displayed with respect to a geographic area 600 here depicted as a simple rectangle for ease of understanding. FIG. 6A represents data for a trip 610 (represented by the dashed-line path) including a plurality of locations (represented by darkened circles) each associated with a timestamp (T). Together, these locations and timestamps may represent the trip 610 taken by a first tracking tag, which may be configured the same as or similarly to tracking tags 102, 104, attached to a first object as that object moves between two locations; starting location 612 (associated with starting timestamp $T_{1-s}$) and destination location 614 (associated with destination timestamp $T_{1-d}$).

FIG. 6B represents data for a trip 620 (represented by the dashed-line path) including a plurality of locations (represented by darkened circles) each associated with a timestamp (T). Together, these locations and timestamps may represent the trip 620 taken by a second tracking tag, which may be configured the same as or similarly to tracking tags 102, 104, attached to a second object as that object moves between two locations; starting location 622 (associated with starting timestamp $T_{2-s}$) and destination location 624

(associated with destination timestamp $T_{2-d}$). Although only a few locations and timestamps are depicted for clarity and ease of understanding, a single trip may be associated with hundreds or even thousands of timestamps for a single tracking tag.

At block 1140, a list identifying at least one dwell time and dwell location is identified. Explicit or implicit in the data of the storage system 250 may be the aforementioned dwell times including information such as how long an object was located within a warehouse or sorting facility as well as information about the type of mode of transportation. For example, a reader device may be associated with information identifying whether the reader device was located within a warehouse or sorting facility, as well as whether the object was transported using a particular mode of transportation such as a cargo truck, an airplane, a train, or other mode of transportation. In some instances, all or some of this information may be provided by a logistic provider. This may be used by the server computing devices 108 may to identify a list of dwell times and corresponding locations for each tracking tag. In this regard, this list may identify an amount of time (e.g., 18 hours or more or less) and an identifier for a location (e.g., a warehouse or sorting facility identifier, GPS coordinates, or some other information that can be used to identify a geographic area). In addition, the server computing devices 108 may use the modes of transportation for the different reader devices which provided information about the tracking tag for the object to identify a list of modes of transportation for the object.

Figure 7:
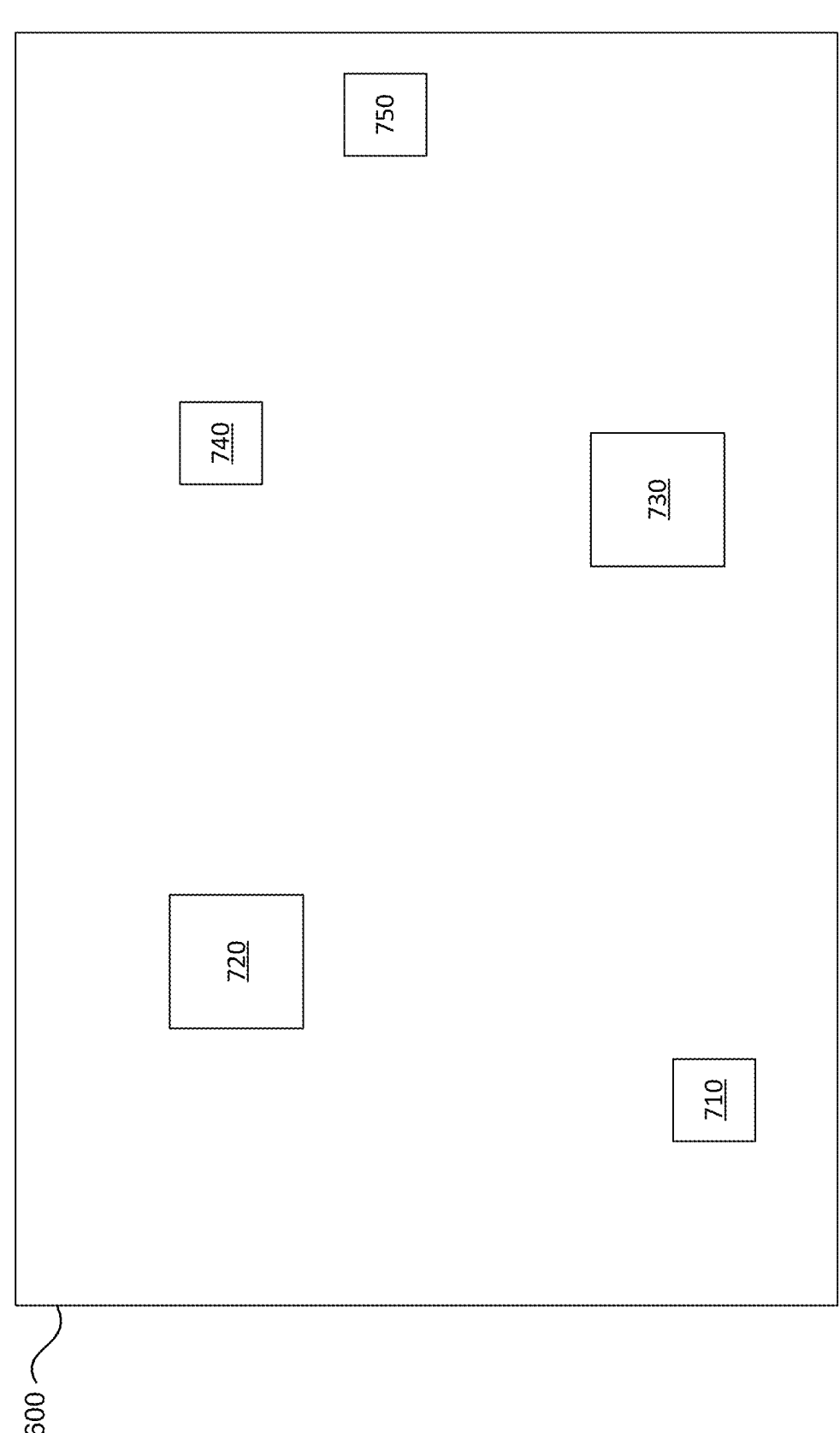
FIG. 7 is an of a geographic area and warehouses or sorting facilities in accordance with aspects of the disclosure.

In some examples, the determination of dwell times and dwell locations may be achieved through various different types of clustering algorithms. As an example, unsupervised clustering algorithms such as the density-based spatial clustering of applications with noise (DBSCAN) may be used. For instance, using the trip data, the clustering algorithm may be used to cluster the locations of tracking tags to uncover locations where the tracking tags dwell for extended periods of time. In addition, or alternatively, the storage system 250 may also store information identifying the geographic areas of warehouses and sorting facilities for each logistic provider. In other instances, a list of the warehouses and sorting facilities may be provided by a logistics provider or determined by the one or more server computing devices 108 based on the data of the storage system 250. For example, by plotting the trips on a map, the locations of warehouses or sorting facilities (which may correspond to longer dwell times) may be inferred from the data stored in the storage system 250 and used as described above. In some instances, satellite imagery may be used to confirm the locations of such warehouses or sorting facilities or other dwell locations (e.g., airports, truck stops, or other transportation hubs). FIG. 7 represents examples of locations of various warehouses or sorting facilities 710, 720, 730, 740, 750 with respect to the geographic area 600. In this example, the warehouses or sorting facilities 710, 720, 730, 740, 750 represent areas rather than specific points and may be of varying shapes and sizes.

The one or more server computing devices 108 may identify timestamps associated with locations within geographic areas corresponding to a warehouse and sorting facility. Based on this, the one or more server computing devices 108 may estimate an amount of time that a tracking tag was located within such geographic areas. This may then be used by the server computing devices 108 to identify a list of dwell times and corresponding locations.

Figure 8A:
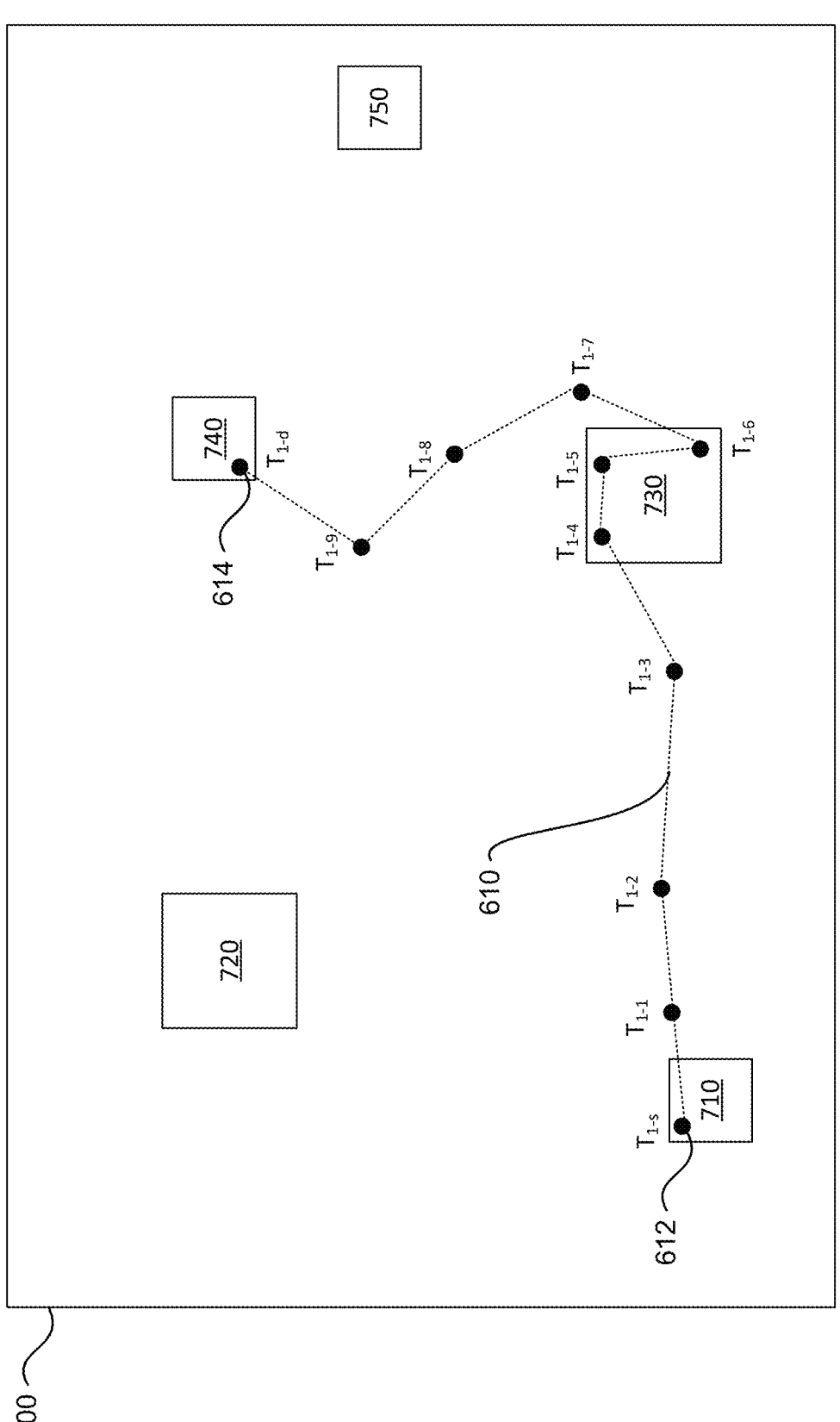
FIGS. 8A and 8B are examples of a geographic area, warehouses or sorting facilities, and trip data in accordance with aspects of the disclosure.

For example, turning to FIG. 8A, both the areas of the warehouses or sorting facilities 710, 720, 730, 740, 750 as well as the data for the trip 610 are depicted. In this example, the first tracking tag may have a dwell location with the area of the warehouse or sorting facility 730. The corresponding dwell time may be determined from at least the difference between timestamps $T_{1-4}$ and $T_{1-6}$, the locations for which are within the area of the warehouse or sorting facility 730.

Figure 8B:
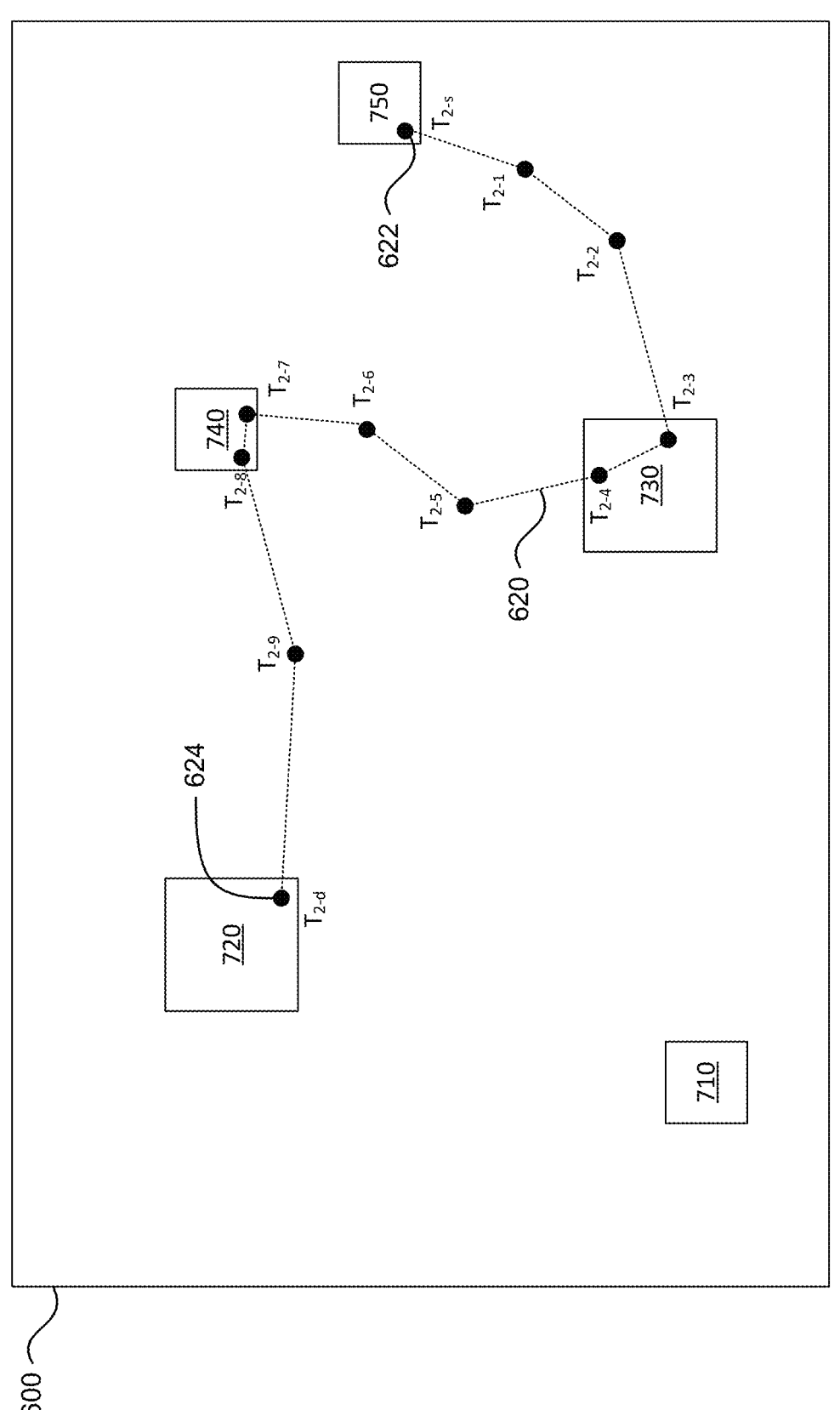

Turning to FIG. 8B, both the areas of the warehouses or sorting facilities 710, 720, 730, 740, 750 as well as the data for the trip 620 are depicted. In this example, the first tracking tag may have a first dwell location with the area of the warehouse or sorting facility 730. The corresponding dwell time for the first dwell location may be determined from at least the difference between timestamps $T_{2-3}$ and $T_{2-4}$, the locations for which are within the area of the warehouse or sorting facility 740. In addition, the first tracking tag may have a second dwell location with the area of the warehouse or sorting facility 730. The corresponding dwell time for the first dwell location may be determined from at least the difference between timestamps $T_{2-7}$ and $T_{2-8}$, the locations for which are within the area of the warehouse or sorting facility 730.

Returning to FIG. 11, at block 1150, a model is trained to output the ETA, a second dwell time, and a second dwell location based on the determined location, the starting location for the tracking tag, the destination location for the tracking tag, the first timestamp, the second timestamp, the third timestamp, and the list. In this regard, when training the model, in addition to the data for the trip 610, a list of the dwell location of the area of the warehouse or sorting facility 740 and the dwell time of the difference between timestamps $T_{2-3}$ and $T_{2-4}$ as well as the dwell location of the area of the warehouse or sorting facility 730 and the dwell time of the difference between timestamps $T_{2-7}$ and $T_{2-8}$ may also be used. Similarly, when training the model, in addition to the data for the trip 610, a list of the dwell location of the area of the warehouse or sorting facility 730 and the dwell time of the difference between timestamps $T_{1-4}$ and $T_{1-6}$ may also be used.

The model itself may be any number of different types of machine-learning models. For instance, the structure of the tracking system may encode key metadata that may lend itself to approaching the problem using graph neural networks (graph convolutional networks, for example). These algorithms may allow for the input of features for all nodes and edges in a connected graph, and leverage the network structure, coupled with features of relevant edges and nodes to predict travel times (ETA) across sub graphs. In this regard, example machine-learning models as used herein may include graph neural networks (GNNs), K-Nearest Neighbors, AdaBoost, Extra Trees, Gradient Boosted Regressor, Random Forest, Linear Regression, Elastic Net, Multi-Layer Perceptron, Voting Regressor (Extra Trees, Gradient Boost, Random Forest), and other such models.

The training may result in tuning parameters of the model, all of which may be stored by the one or more server computing devices 108 in the storage system 250 for later access, retrieval and use as discussed further below.

The model may be configured, trained and then used to output an ETA, dwell times and dwell locations for an object to reach a destination from its current location (e.g., the starting location) if that object leaves at a particular time (e.g., the starting timestamp). For example, a starting location, a destination location, and a starting timestamp may be input into the model, and the model may provide or output an ETA for an object to reach the destination location as well as a list of dwell times and corresponding dwell locations. In this regard, the model may identify a list of warehouses or sorting facilities that the object is expect to pass through in order to reach its destination as well as estimates of when the object will arrive and depart (e.g., between which is the dwell time for that warehouse or sorting facility) for that warehouse or sorting facility.

The model may also output information about modes of transportation for an object. In this regard, the aforementioned list of modes of transportation identified from the modes of transportation associated with a reader device that provided information to the server computing devices about the tracking tag for an object as described above may also be used to train the mode. The model may thus be configured and trained to output a list of likelihoods of the object being transported on an airplane, cargo truck, boat, train or other modes of transportation.

In this regard, the starting location and time and destination location may be used as training inputs, while other information such as the intermediate locations and timestamps, run duration (which may be determined based on the start time and destination time), list of mode of transportation) (e.g., airplane, cargo trucks, boats, trains, etc.), as well as the list of dwell times and locations, etc. may be used as training outputs.

Figure 9:
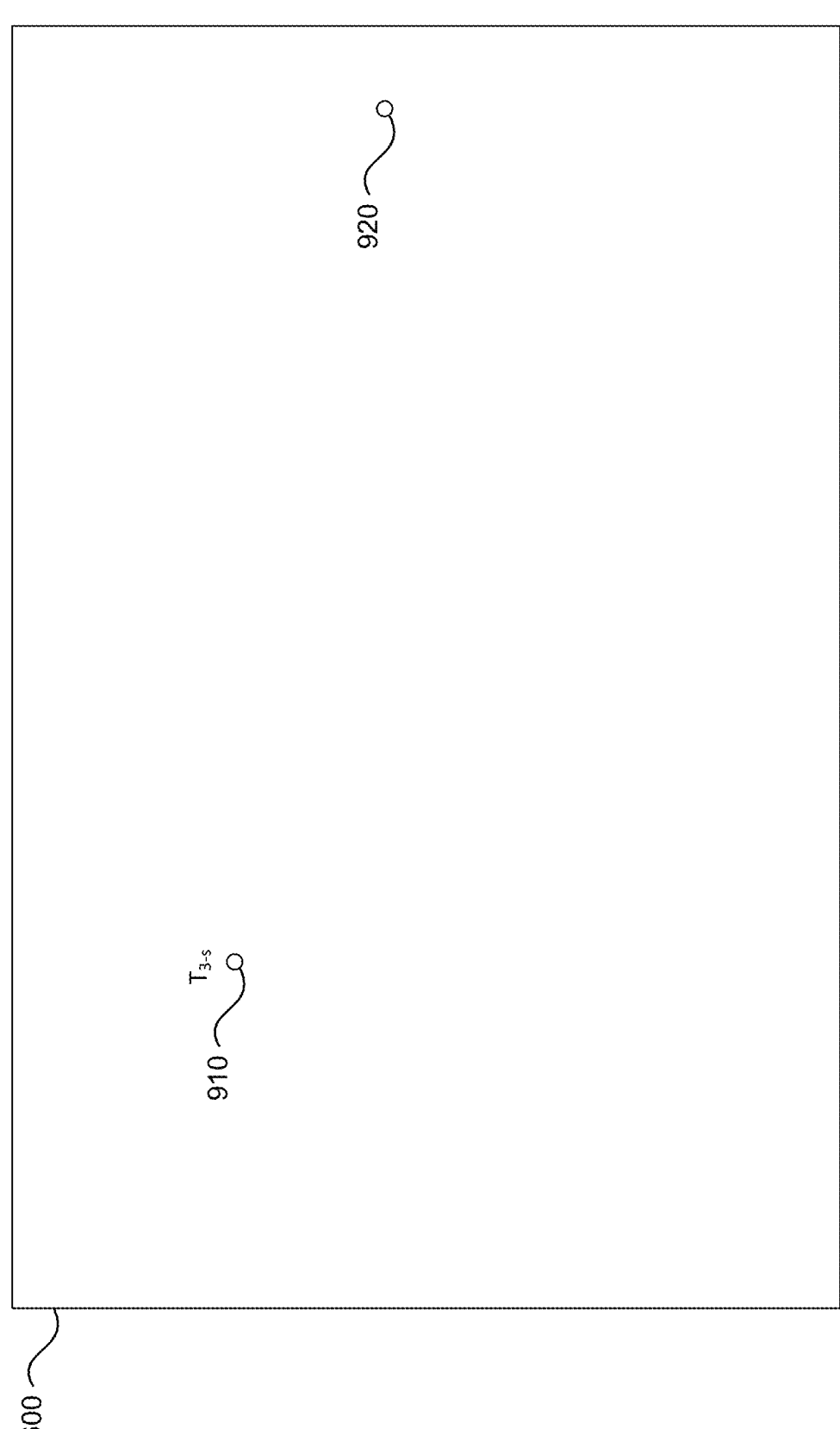
FIG. 9 is an example of a geographic area, a starting location, a starting timestamp, and a destination location in accordance with aspects of the disclosure.
Figure 10:
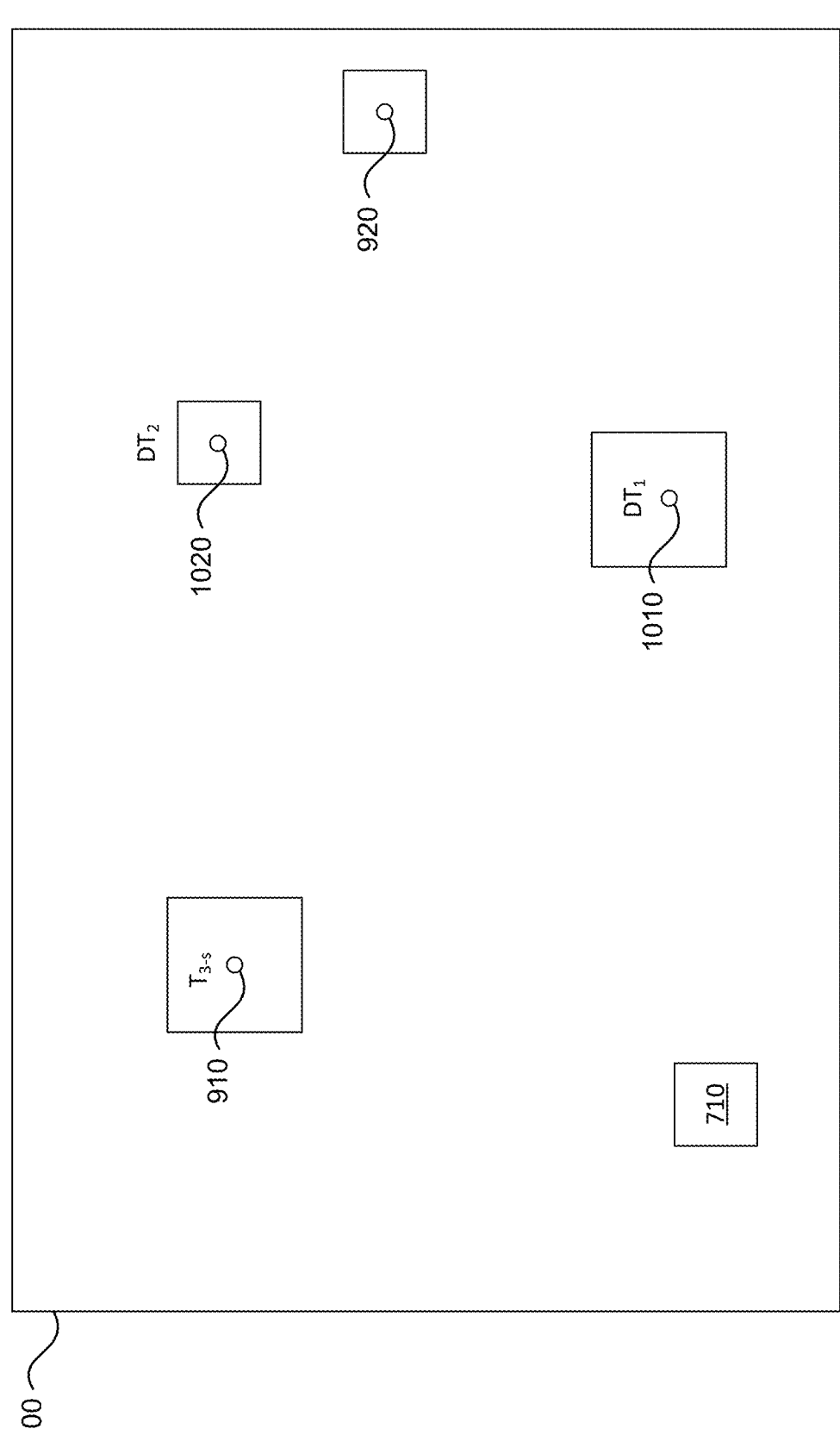
FIG. 10 is an example of a geographic area, a starting location, a starting timestamp, a destination location, dwell locations and dwell times in accordance with aspects of the disclosure.

The model may also be used, for example, by the server computing devices 108, in real time to determine whether a particular object is running ahead or behind its ETA and to generate and provide alerts to the logistical provider. As an example, FIG. 9 represents a starting location 910, a starting timestamp $T_{3-s}$, and a destination location 920 for a third tracking tag which may be attached to a third object. In this example, the starting location 910 corresponds to a location within the area of the warehouse or sorting facility 720, and the destination location 920 corresponds to a location within the area of the warehouse or sorting facility 750. Of course, starting and destination locations may be located outside of warehouses and sorting facilities. This information, starting location 910, starting timestamp $T_{3-s}$, and destination location 920, may be input into the trained model in order to generate both an ETA (not depicted) as well as a list of one or more dwell locations and dwell times as represented by FIG. 10. In this example, the list one or more dwell locations and dwell times may identify location 1010 corresponding to a location within the warehouse or sorting facility 730 as well as location 1020 corresponding to a location within the warehouse or sorting facility 740.

In this regard, a route may be considered the sum of transit and dwell components or segments of the route. For instance, a particular route may be expressed as S1→S2→D1→S3→D2→S4→A. Each "S" may represent a transit segment, each "D" may represent a dwell location, and "A" may represent arrival at the delivery location. The model may be trained to determine the probability surface of expected routes between the starting location and destination location. This may include expectations of stops at known dwell locations, and encompasses various modes of transportation. An ETA estimate may be produced based on the probability weighted average of the ETA estimates across each of the potential routes. Using the example above, the model may predict ETA_0, the time to traverse S1 (starting at T0), ETA_1, the time to traverse S2 (starting at T_0+ETA_0), ETA_2, the time spent dwelling at D1 (starting at T_0+ETA_0+ETA 1), and so on. As a trip progresses, the model may refine the route probabilities as well as the route (and segment) ETA estimates. In addition, data collected from warehouse or sorting facilities using the tracking tags and reader devices described above may enable the model to determine an expected dwell time, given an arrival time at that warehouse or sorting facility. Data collected from tracking tags may enable the modeling of the expected time required to traverse a particular segment, given an arrival time.

To detect delays, progress may be monitored vs the initial ETA by updating the ETA with each new location reported by or inferred from data provided by a reader device. If at any point during a trip the delay becomes too large, a delay alert may be generated and provided. This threshold may be based on the initial ETA plus some period of time reasonable for transportation of objects such as 5 hours or more or less. As an example, the evaluation of the following equation may be used to detect delays: (current trip time+estimated time remaining)>(initial ETA+5 hours). If true, an alert may be generated and provided by the server computing devices 108 to any of the client computing devices 220, 230, 240 on the displays 224, 234, 244 of such devices for display to a user, such as user 222, 232, 242, of respective client computing devices 220, 230, 240. Lowering the threshold at which delay alerts are generated will increase the rate at which true positives are identified, but also increase the number of false positives.

In some instances, the throughput of facilities may be monitored by the tracking system in real time using the tracking tags and reader devices as described above. This information can be used to incorporate the impact of slowdowns in the ETAs generated by the model. In some instances, spatial-temporal GNNs may be especially well suited to solving ETA problems across complex, interconnected graphs. With the above data provided by the reader devices via beacon signals from tracking tags, the tracking system may be able to develop node and edge features via training that such GNNs may require.

This may even allow the tracking system to determine or suggest the likely root cause of slowdowns potentially down to specific components (e.g., warehouses or sorting facilities, storage areas within such facilities, personnel, trucks, forklifts, etc.). For instance, a warehouse or sorting facility slowdown at time "T" could be caused by either a supply side issue of resources (lack of adequate employees, malfunctioning equipment, etc.) or demand side (too many packages arriving at a particular time). A slowdown at time T will also likely influence slowdowns at times "T+t", "T+2t", etc. where t is some additional amount of time. In this regard, how a current slowdown impacts future slowdowns may be related to what is causing the current slowdown. By using the tracking tags and reader devices as discussed above, the tracking system may be able to pinpoint the cause of slowdowns and therefore better model expected durations of such slowdowns. Further, because the model may provide estimates of when an object will arrive at a particular warehouse or sorting facility, these predictions may be used to estimate future slowdowns at that particular warehouse or sorting facility. In other words, the model and reader devices may be used to identify the interdependencies of such components on the tracking system in real time by providing information such as capacity and utilization of warehouses and sorting facilities, trucks, time, transit patterns and times within particular warehouses and sorting facilities (including actual and potential sources of bottlenecking within the tracking system). For instance, if estimated dwell times at particular dwell locations are going beyond some reasonable period of time as in the example of ETA notifications above, this may cause further downstream delays. This may enable the tracking system to send notifications to both identify a potential problem (e.g., a dwell time that is going too long) and potentially quantify the impact of facility slowdowns on future deliveries, enabling proactive intervention.

In some instances, the model may be trained based on data for trips from a single logistical provider or geographical area (e.g., country) thereby optimizing the output of the model for that logistical provider or geographical area. In this regard, the more models that are trained for different logistical providers using different information, the more different types of insights may be made and used across different supply chain networks to improve ETAs for individual logistical providers.

In some instances, additional information may be used as training data to enable the model to provide potentially even more accurate ETAs. For example, this additional information may include real time traffic information and corresponding map features and information. In this regard, when using the model to generate an ETA, such information (e.g., current and/or future traffic information) may be input into the model.

In some instances, the ETA may be provided as a "delivery window" and a probability of an object reaching the destination location within the delivery window. For instance, delivery windows may be provided in the trip data or may be approximated by adding a buffer amount of time to the timestamp for the destination location. This may then be used as training outputs to train the aforementioned model and used to provide real time estimations of delivery windows. In this regard, for real time delays that may impact a delivery window, the tracking system may provide additional notifications and, in some instances, may include notifications that may identify "high impact" delays for perishable or high-cost objects.

In addition, based on the geographic areas of warehouses or sorting facilities, movement patterns within a warehouse or sorting facility may also be inferred in the data for a trip.

The features described herein may allow for highly accurate ETAs for the transportation of objects such as goods within a supply-chain or other logistics space. As discussed above, the modeling may implicitly take into account logistical issues beyond those of a typical routing service without necessarily taking into account map information or an actual route that will be followed by an object to its destination. In addition, the features described herein may allow for the identification of upstream components which may be driving an expected slowdown, thus delivering actionable insights to logistical providers, and enabling them to take corrective action in real-time.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same as or similar elements.

The invention claimed is:

1. A method of training a model to provide an estimated time of arrival (ETA) for transporting an object, the method comprising:

receiving, by one or more processors, data from a reader device, the data identifying a tracking tag associated with the object and a first timestamp;

determining, by the one or more processors, based on the received data, a location of the tracking tag at the first timestamp;

identifying, by the one or more processors, a starting location and second timestamp for the tracking tag and a destination location and third timestamp for the tracking tag;

identifying, by the one or more processors, a list including at least one dwell time and dwell location for the tracking tag; and training, by the one or more processors, the model to output the ETA, a second dwell time, and a second dwell location for the object based on the determined location, the starting location for the tracking tag, the destination location for the tracking tag, the first timestamp, the second timestamp, the third timestamp, and the list, wherein the training does not involve using an actual route that will be followed by the object to the destination location; and identifying, based on output of the model, one or more upstream components involved in transporting the object that are slowing transportation of the object, wherein identifying the one or more upstream components enables a logistical provider to take corrective action by modifying the one or more upstream components.

2. The method of claim 1, further comprising, determining a run duration based on the second timestamp and the third timestamp, and wherein training the model includes using the run duration.

3. The method of claim 1, wherein the data further identifies a mode of transportation associated with the reader device, and wherein training the model further includes using the mode of transportation associated with the reader device to train the model to output one or more modes of transportation with the ETA.

4. The method of claim 1, wherein the model is configured to identify dwell locations and dwell times for the object for the ETA.

5. The method of claim 1, further comprising, receiving second data from a second reader device, the second data identifying the tracking tag and a fourth timestamp, and wherein determining the location is further based on the second data.

6. The method of claim 1, wherein the data indicates that a beacon signal was received by the reader device from the tracking tag at the first timestamp.

7. The method of claim 1, further comprising:

using the model to determine an ETA for a second object to reach a second destination location;

receiving second data from a second reader device identifying a tracking tag for the second object;

determining a location of the second object based on the received second data; and using the model to determine an updated ETA for the second object based on the determined location of the second object.

8. The method of claim 7, further comprising, comparing the updated ETA for the second object to the ETA for the second object to determine whether the second object is delayed.

9. The method of claim 8, based on the comparison, providing an alert.

10. The method of claim 8, further comprising, when the second object is determined to be delayed, determining a likely root cause of a slowdown associated with the second object.

11. The method of claim 8, further comprising, when the second object is determined to be delayed, estimating a future slowdown at the second destination location.

12. The method of claim 1, wherein the model is one of an extra tree model, gradient boosted regressor model, random forest model, or a voting regression model.

13. The method of claim 1, wherein the model is trained to output the list such that the list includes the second dwell time, the second dwell location, and a third dwell time and third dwell location.

14. The method of claim 1, wherein the model is trained for trips from a single logistical provider in order to optimize output of the model for that logistical provider.

15. The method of claim 1, wherein the model is trained for trips within a geographic area in order to optimize output of the model for that geographic area.

16. The method of claim 1, wherein the training does not involve using map information.

17. A system for training a model to provide an estimated time of arrival (ETA) for transporting an object, the system comprising one or more processors configured to:

receive data from a reader device, the data identifying a tracking tag associated with the object and a first timestamp;

determine, based on the received data, a location of the tracking tag at the first timestamp;

identify, a starting location and second timestamp for the tracking tag and a destination location and third timestamp for the tracking tag;

identify a list including at least one dwell time and dwell location for the tracking tag; and train the model to output the ETA, a second dwell time, and a second dwell location for the object based on the determined location, the starting location for the tracking tag, the destination location for the tracking tag, the first timestamp, the second timestamp, the third timestamp, and the list, wherein the training does not involve using an actual route that will be followed by the object to the destination location; and identify, based on output of the model, one or more upstream components involved in transporting the object that are slowing transportation of the object, wherein identifying the one or more upstream components enables a logistical provider to take corrective action by modifying the one or more upstream components.

18. The system of claim 17, wherein the one or more processors are further configured to:

use the model to determine an ETA for a second object to reach a second destination location; and use the model to determine a second dwell time and dwell location for the second object to reach the second destination location.

19. The system of claim 17, wherein the one or more processors are further configured to:

use the model to determine an ETA for a second object to reach a second destination location;

receive second data from a second reader device identi-
fying a tracking tag for the second object;

determine a location of the second object based on the
received second data; and use the model to determine an updated ETA for the second
object based on the determined location of the second
object.

20. The system of claim 19, wherein the one or more
processors are further configured to compare the updated
ETA for the second object to the ETA for the second object
to determine whether the second object is delayed.

\* \* \* \* \*